(12) United States Patent
Wang et al.

(10) Patent No.: US 11,068,134 B2
(45) Date of Patent: Jul. 20, 2021

(54) METHOD AND APPARATUS FOR CREATING DESKTOP WIDGET, AND TERMINAL DEVICE

(71) Applicant: Huawei Device Co., Ltd., Guangdong (CN)

(72) Inventors: Shoucheng Wang, Shanghai (CN); Yujing Bai, Wuhan (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 0 days.

(21) Appl. No.: 16/424,042

(22) Filed: May 28, 2019

(65) Prior Publication Data

US 2019/0278447 A1    Sep. 12, 2019

Related U.S. Application Data

(63) Continuation of application No. 14/567,225, filed on Dec. 11, 2014, now abandoned, which is a
(Continued)

(30) Foreign Application Priority Data

Jan. 31, 2013    (CN) .......................... 201310038921.2

(51) Int. Cl.
*G06F 3/0484* (2013.01)
*G06F 3/0481* (2013.01)

(52) U.S. Cl.
CPC .......... *G06F 3/0484* (2013.01); *G06F 3/0481* (2013.01)

(58) Field of Classification Search
CPC .............................. G06F 3/0484; G06F 3/0481
See application file for complete search history.

(56) References Cited

U.S. PATENT DOCUMENTS

| 8,438,495 B1* | 5/2013 | Gilra | G06F 40/14 |
| | | | 715/781 |
| 2003/0020671 A1* | 1/2003 | Santoro | G06F 3/0481 |
| | | | 345/1.3 |

(Continued)

FOREIGN PATENT DOCUMENTS

| CN | 101714060 A | 5/2010 |
| CN | 101853158 A | 10/2010 |

(Continued)

OTHER PUBLICATIONS

Partial English Translation and Abstract of Chinese Patent Application No. CN102436335A, Mar. 13, 2015, 4 pages.
(Continued)

*Primary Examiner* — John T Repsher, III
(74) *Attorney, Agent, or Firm* — Conley Rose, P.C.

(57) ABSTRACT

A method and an apparatus for creating a desktop widget. The method includes acquiring a desktop widget framework of a desktop widget. The desktop widget framework is used to hold at least two desktop widget units, and the desktop widget framework includes at least two desktop widget configuration areas. The method further includes controlling, according to a first movement operation performed on a first desktop widget unit, the first desktop widget unit to move along a movement track of the first movement operation. The first movement operation is used to move the first desktop widget unit. The method further includes positioning the first desktop widget unit in a first specified desktop widget configuration area when the first movement operation ends.

20 Claims, 8 Drawing Sheets

Related U.S. Application Data continuation of application No. PCT/CN2014/070803, filed on Jan. 17, 2014.

(56) References Cited

U.S. PATENT DOCUMENTS

| | | | |
|---|---|---|---|
| 2007/0044039 | A1 | 2/2007 | Amadio et al. |
| 2007/0130541 | A1 | 6/2007 | Louch et al. |
| 2010/0088597 | A1* | 4/2010 | Shin .................... G06F 9/44505 715/704 |
| 2010/0100841 | A1 | 4/2010 | Shin et al. |
| 2010/0295789 | A1 | 11/2010 | Shin et al. |
| 2011/0078616 | A1 | 3/2011 | Shaudhri et al. |
| 2011/0087981 | A1 | 4/2011 | Jeong et al. |
| 2011/0099508 | A1 | 4/2011 | Liu |
| 2012/0046079 | A1* | 2/2012 | Kim .................... H04M 1/72544 455/566 |
| 2012/0169768 | A1* | 7/2012 | Roth .................... G06F 3/04886 345/629 |
| 2012/0225644 | A1 | 9/2012 | Cho |
| 2012/0284658 | A1 | 11/2012 | Hirvonen |
| 2013/0125043 | A1* | 5/2013 | Jeon .................... G06F 3/0488 715/782 |
| 2014/0115509 | A1 | 4/2014 | Deng et al. |
| 2014/0317551 | A1 | 10/2014 | Yang et al. |

FOREIGN PATENT DOCUMENTS

| | | |
|---|---|---|
| CN | 101996019 A | 3/2011 |
| CN | 102045436 A | 5/2011 |
| CN | 102156750 A | 8/2011 |
| CN | 102308272 A | 1/2012 |
| CN | 102436335 A | 5/2012 |
| CN | 102439558 A | 5/2012 |
| CN | 102662578 A | 9/2012 |
| CN | 102736903 A | 10/2012 |
| CN | 103116452 A | 5/2013 |
| JP | 2009116471 A | 5/2009 |
| JP | 2010538394 A | 12/2010 |
| KR | 20100051119 A | 5/2010 |
| WO | 2009032750 | 3/2009 |
| WO | 2010134718 A2 | 11/2010 |

OTHER PUBLICATIONS

Partial English Translation and Abstract of Chinese Patent Application No. CN103116452A, Mar. 13, 2015, 3 pages.
Partial English Translation and Abstract of Japanese Patent Application No. JPA2010538394, Jan. 6, 2017, 19 pages.
Machine Translation and Abstract of Chinese Publication No. CN101996019, Mar. 30, 2011, 7 pages.
Machine Translation and Abstract of Japanese Publication No. JP2009116471, May 28, 2009, 11 pages.
JQuery Foundation, "Sortable Widget | jQuery UI API Documentation," Retrieved from the Internet: URL: http://web.archive.org/web/20130118053819/http://api.jqueryui.com/sortable/ [retrieved on Nov. 2, 2016], Jan. 18, 2013, 7 pages.
Foreign Communication From a Counterpart Application, Chinese Application No. 201310038921.2, Chinese Office Action dated Feb. 4, 2015, 17 pages.
Foreign Communication From a Counterpart Application, PCT Application No. PCT/CN2014/070803, English Translation of International Search Report dated Apr. 21, 2014, 2 pages.
Foreign Communication From a Counterpart Application, PCT Application No. PCT/CN2014/070803, English Translation of Written Opinion dated Apr. 21, 2014, 5 pages.
Foreign Communication From a Counterpart Application, European Application No. 14745339.3, Extended European Search Report dated May 13, 2015, 6 pages.
Foreign Communication From a Counterpart Application, Chinese Application No. 201310038921.2, Chinese Office Action dated Mar. 22, 2016, 16 pages.
Foreign Communication From a Counterpart Application, Chinese Application No. 201310038921.2, Chinese Notice of Rejection dated Jul. 28, 2016, 18 pages.
Foreign Communication From a Counterpart Application, European Application No. 14745339.3, European Office Action dated Nov. 9, 2016, 7 pages.
Foreign Communication From a Counterpart Application, Japanese Application No. 2015-555565, Japanese Rejection dated Nov. 8, 2016, 3 pages.
Foreign Communication From a Counterpart Application, Japanese Application No. 2015-555565, English Translation of Japanese Rejection dated Nov. 8, 2016, 3 pages.
Foreign Communication From a Counterpart Application, Korean Application No. 10-2015-7022551, Korean Office Action dated Jan. 20, 2017, 4 pages.
Foreign Communication From a Counterpart Application, Korean Application No. 10-2015-7022551, English Translation of Korean Office Action dated Jan. 20, 2017, 3 pages.
Foreign Communication From a Counterpart Application, Chinese Application No. 201810246648.5, Chinese Office Action dated Mar. 27, 2019, 17 pages.
Yanan, "Research and Implementation of Man-Machine Interaction Based on Android Platform," Master Degree Thesis of Beijing University of Posts and Telecommunications, Jan. 2011, total 72 pages. With the translation of the related part.

* cited by examiner

METHOD AND APPARATUS FOR CREATING DESKTOP WIDGET, AND TERMINAL DEVICE

CROSS-REFERENCE TO RELATED APPLICATIONS

This application is a continuation of U.S. patent application Ser. No. 14/567,225 filed on Dec. 11, 2014, which is a continuation of International Application No. PCT/CN2014/070803 filed on Jan. 17, 2014, which claims priority to Chinese Patent Application No. 201310038921.2 filed on Jan. 31, 2013. All of the aforementioned patent applications are hereby incorporated by reference in their entireties.

TECHNICAL FIELD

The present disclosure relates to the terminal device field, and in particular, to a method and an apparatus for creating a desktop widget, and a terminal device.

BACKGROUND

Along with smart development of terminal devices, an interface of a terminal device is no longer used only to display application icons (icons), but can display desktop widgets (Widgets), such as a weather Widget, a mail Widget, and a calendar Widget, that are used to display functional information. Compared with an application icon, a Widget not only provides an entry to an application, but also can demonstrate corresponding function information, which is more attractive to a user.

In other approaches, an interface of a terminal device may display, in a desktop widget, corresponding information of a function or a set of functions of the widget; for example, display weather information of a city in a weather Widget; or display weather information of multiple cities in the weather Widget.

Some other approaches have at least the following problems: one Widget can implement only a single function, that is, one Widget can display only information of a same type; as a result, a user cannot acquire diversified information using the Widget, and a single implementation manner cannot meet a personalization requirement of a user.

SUMMARY

To solve a problem of verified information acquisition, embodiments of the present disclosure provide a method and an apparatus for creating a desktop widget, and a terminal device. Technical solutions are as follows.

According to a first aspect, an embodiment of the present disclosure provides a method for creating a desktop widget, where the method includes acquiring a desktop widget framework of the desktop widget, where the desktop widget framework is used to hold at least two or more than two desktop widget units, and the desktop widget framework includes at least two or more than two desktop widget configuration areas; controlling, according to a first movement operation performed on a first desktop widget unit, the first desktop widget unit to move along a movement track of the first movement operation, where the first movement operation is used to move the first desktop widget unit; and positioning the first desktop widget unit in a first specified desktop widget configuration area when the first movement operation ends, where the first specified desktop widget configuration area is a blank desktop widget configuration area the first movement operation is located when the first movement operation ends, and the first desktop widget unit maps to a first application program.

With reference to the first aspect, in a first possible implementation manner according to the embodiment of the present disclosure, the acquiring a desktop widget framework of the desktop widget, where the desktop widget framework includes at least two or more than two desktop widget configuration areas includes displaying at least one desktop widget framework of the desktop widget; and when a first touchscreen operation performed on any desktop widget framework in the at least one desktop widget framework is received, acquiring a desktop widget framework corresponding to the first touchscreen operation, where the first touchscreen operation is used to select the at least one desktop widget framework.

With reference to the first aspect in a second possible implementation manner according to the embodiment of the present disclosure, after the acquiring a desktop widget framework of the desktop widget, the method further includes controlling, according to a second movement operation performed on a second desktop widget unit, the second desktop widget unit to move along a movement track of the second movement operation, where the second movement operation is used to move the second desktop widget unit; and positioning the second desktop widget unit in a second specified desktop widget configuration area when the second movement operation ends, where the second specified desktop widget configuration area is a blank desktop widget configuration area in which the second movement operation is located when the second movement operation ends; and the second desktop widget unit maps to the first application program or a second application program.

With reference to first aspect, in a third possible implementation manner according to the embodiment of the present disclosure, the positioning the first desktop widget unit in a first specified desktop widget configuration area when the first movement operation ends, where the first specified desktop widget configuration area is a blank desktop widget configuration area in which the first movement operation is located when the first movement operation ends, and the first desktop widget unit maps to a first application program includes, when the first movement operation ends, and an overlap ratio of the first desktop widget unit to the desktop widget configuration area in which the end point of the first movement operation is located is greater than or equal to a preset ratio, positioning the first desktop widget unit in the first specified desktop widget configuration area, where the first specified desktop widget configuration area is the blank desktop widget configuration area in which the first movement operation is located when the first movement operation ends; and the first desktop widget unit maps to the first application program.

With reference to the first aspect, in a fourth possible implementation manner according to the embodiment of the present disclosure, after the positioning the first desktop widget unit in a first specified desktop widget configuration area when the first movement operation ends, the method further includes saving positioning information of the positioned first desktop widget unit in the desktop widget framework as layout information of the first desktop widget unit; and when a second touchscreen operation performed on the desktop widget is received, loading each desktop widget unit according to saved layout information of each desktop widget unit; and displaying each desktop widget unit at a location, corresponding to the layout information of each desktop widget unit, in the desktop widget, where the second touchscreen operation is used to start the desktop widget.

According to a second aspect, an embodiment of the present disclosure provides an apparatus for creating a desktop widget, where the apparatus includes a framework acquiring module configured to acquire a desktop widget framework of the desktop widget, where the desktop widget framework is used to hold at least two or more than two desktop widget units, and the desktop widget framework includes at least two or more than two desktop widget configuration areas; a control module configured to control, according to a first movement operation performed on a first desktop widget unit, the first desktop widget unit to move along a movement track of the first movement operation, where the first movement operation is used to move the first desktop widget unit; and a positioning module configured to position the first desktop widget unit in a first specified desktop widget configuration area when the first movement operation ends, where the first specified desktop widget configuration area is a blank desktop widget configuration area in which the first movement operation is located when the first movement operation ends, and the first desktop widget unit maps to a first application program.

With reference to the second aspect, in a first possible implementation manner according to the embodiment of the present disclosure, the framework acquiring module is configured to display at least one desktop widget framework of the desktop widget; and when a first touchscreen operation performed on any desktop widget framework in the at least one desktop widget framework is received, acquire a desktop widget framework corresponding to the first touchscreen operation, where the first touchscreen operation is used to select the at least one desktop widget framework.

With reference to the second aspect, in a second possible implementation manner according to the embodiment of the present disclosure, the control module is further configured to control, according to a second movement operation performed on a second desktop widget unit, the second desktop widget unit to move along a movement track of the second movement operation, where the second movement operation is used to move the second desktop widget unit; and the positioning module is further configured to position the second desktop widget unit in a second specified desktop widget configuration area when the second movement operation ends, where the second specified desktop widget configuration area is a blank desktop widget configuration area in which the second movement operation is located when the second movement operation ends; and the second desktop widget unit maps to the first application program or a second application program.

With reference to the second aspect, in a third possible implementation manner according the embodiment of the present disclosure, the positioning module is configured to, when the first movement operation ends, and an overlap ratio of the first desktop widget unit to the desktop widget configuration area in which the end point of the first movement operation is located is greater than or equal to a preset ratio, position the first desktop widget unit in the first specified desktop widget configuration area, where the first specified desktop widget configuration area is the blank desktop widget configuration area in which the first movement operation is located when the first movement operation ends; and the first desktop widget unit maps to the first application program.

With reference to the second aspect, in a fourth possible implementation manner according to the embodiment of the present disclosure, the apparatus further includes a storing module configured to save positioning information of the positioned first desktop widget unit in the desktop widget framework as layout information of the first desktop widget unit; and a loading module configured to, when a second touchscreen operation performed on the desktop widget is received, load each desktop widget unit according to saved layout information of each desktop widget unit; and display each desktop widget unit at a location, corresponding to the layout information of each desktop widget unit, in the desktop widget, where the second touchscreen operation is used to start the desktop widget.

According to a third aspect, an embodiment of the present disclosure provides a terminal device, where the terminal device includes a processor configured to acquire a desktop widget framework of a desktop widget, where the desktop widget framework is used to hold at least two or more than two desktop widget units, and the desktop widget framework includes at least two or more than two desktop widget configuration areas; where the processor is further configured to control, according to a first movement operation performed on a first desktop widget unit, the first desktop widget unit to move along a movement track of the first movement operation, where the first movement operation is used to move the first desktop widget unit; and the processor is further configured to position the first desktop widget unit in a first specified desktop widget configuration area when the first movement operation ends, where the first specified desktop widget configuration area is a blank desktop widget configuration area in which the first movement operation is located when the first movement operation ends, and the first desktop widget unit maps to a first application program.

With reference to the third aspect, in a first possible implementation manner according to the embodiment of the present disclosure, the processor is configured to display at least one desktop widget framework of the desktop widget; and when a first touchscreen operation performed on any desktop widget framework in the at least one desktop widget framework is received, acquire a desktop widget framework corresponding to the first touchscreen operation, where the first touchscreen operation is used to select the at least one desktop widget framework.

With reference to the third aspect, in a second possible implementation manner according to the embodiment of the present disclosure, the processor is further configured to control, according to a second movement operation performed on a second desktop widget unit, the second desktop widget unit to move along a movement track of the second movement operation, where the second movement operation is used to move the second desktop widget unit; and the processor is further configured to position the second desktop widget unit in a second specified desktop widget configuration area when the second movement operation ends, where the second specified desktop widget configuration area is a blank desktop widget configuration area in which the second movement operation is located when the second movement operation ends; and the second desktop widget unit maps to the first application program or a second application program.

With reference to third aspect, in a third possible implementation manner according the embodiment of the present disclosure, the processor is configured to, when the first movement operation ends, and an overlap ratio of the first desktop widget unit to the desktop widget configuration area in which the end point of the first movement operation is located is greater than or equal to a preset ratio, position the first desktop widget unit in the first specified desktop widget configuration area, where the first specified desktop widget configuration area is the blank desktop widget configuration area in which the first movement operation is located when the first movement operation ends; and the first desktop widget unit maps to the first application program.

With reference to third aspect, in a fourth possible implementation manner according to the embodiment of the present disclosure, the terminal device further includes a memory configured to save positioning information of the positioned first desktop widget unit in the desktop widget framework as layout information of the first desktop widget unit; where the processor is further configured to, when a second touchscreen operation performed on the desktop widget is received, load each desktop widget unit according to saved layout information of each desktop widget unit; and display each desktop widget unit at a location, corresponding to the layout information of each desktop widget unit, in the desktop widget, where the second touchscreen operation is used to start the desktop widget.

The embodiments of the present disclosure provide a method and an apparatus for creating a desktop widget, and a terminal device. The method includes: acquiring a desktop widget framework of the desktop widget, where the desktop widget framework is used to hold at least two or more than two desktop widget units, and the desktop widget framework includes at least two or more than two desktop widget configuration areas; controlling, according to a first movement operation performed on a first desktop widget unit, the first desktop widget unit to move along a movement track of the first movement operation, where the first movement operation is used to move the first desktop widget unit; and positioning the first desktop widget unit in a first specified desktop widget configuration area when the first movement operation ends, where the first specified desktop widget configuration area is a blank desktop widget configuration area in which the first movement operation is located when the first movement operation ends, and the first desktop widget unit maps to a first application program. Using the technical solutions provided in the embodiments of the present disclosure, by means of configuring two or more than two desktop widget configuration areas, a purpose of implementing multiple Widgets in one desktop widget framework is achieved, which satisfies characteristic customization of different users, and improves personalization of terminal device configuration.

BRIEF DESCRIPTION OF THE DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DETAILED DESCRIPTION

To make the objectives, technical solutions, and advantages of the present invention clearer, the following further describes the embodiments of the present disclosure in detail with reference to the accompanying drawings.

Figure 1:
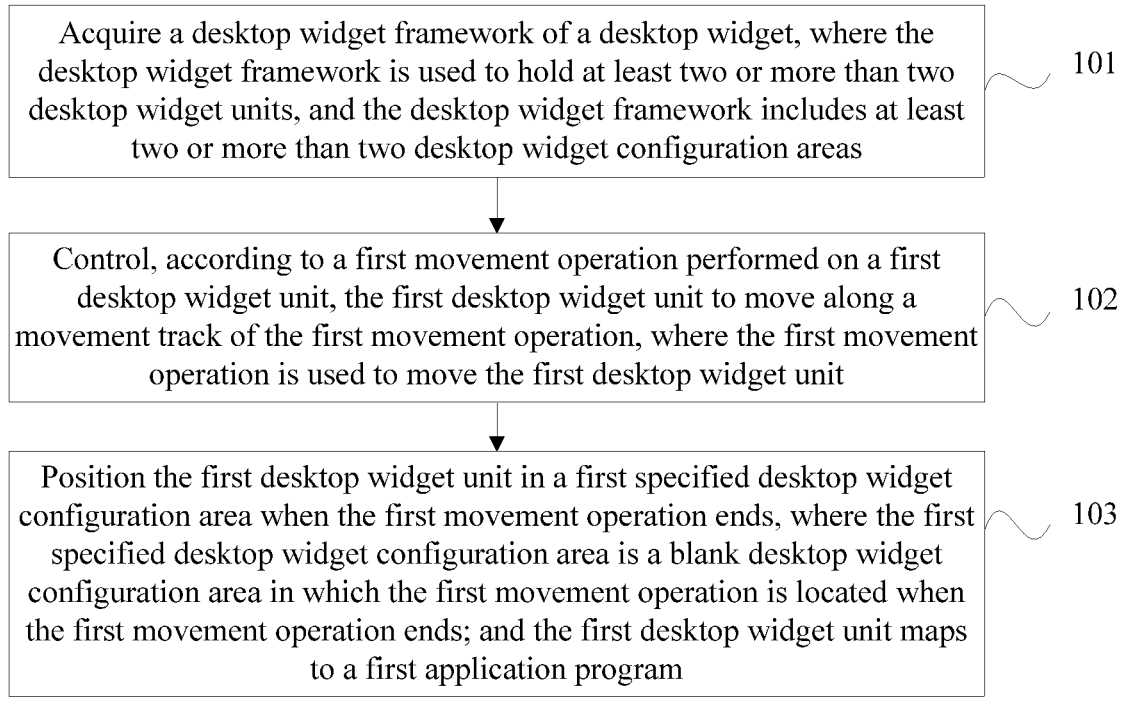
FIG. 1 is a flowchart of a method for creating a desktop widget according to an embodiment of the present disclosure.

FIG. 1 is a flowchart of a method for creating a desktop widget according to an embodiment of the present disclosure. Referring to FIG. 1, the method includes the following steps.

101: Acquire a desktop widget framework of the desktop widget, where the desktop widget framework is used to hold at least two or more than two desktop widget units, and the desktop widget framework includes at least two or more than two desktop widget configuration areas.

The desktop widget refers to a desktop widget collection that may be used to map at least two desktop widget units. An organization manner of the desktop widget collection may be implemented by the desktop widget framework. The desktop widget framework is used to hold at least two or more than two desktop widget units, and the desktop widget framework includes at least two or more than two desktop widget configuration areas. Each desktop widget configuration area may be used to display a desktop widget unit, and each desktop widget unit may map to a same application program, and may also map to different application programs, where the mapping to different application programs may be implemented by expanding the desktop widget.

It should be noted that, a creating process may be considered as a process of editing the desktop widget. In the process, a desktop widget unit may be added, moved, and deleted.

102: Control, according to a first movement operation performed on a first desktop widget unit, the first desktop widget unit to move along a movement track of the first movement operation, where the first movement operation is used to move the first desktop widget unit.

The first desktop widget unit may be a desktop widget unit that is already located in a desktop widget configuration area in the desktop widget framework, and may also be a desktop widget unit that is not positioned in the desktop widget configuration area. That is, the first movement operation may be an operation of adding the first desktop widget unit to the desktop widget configuration area in the desktop widget framework, and may also be an operation of moving the first desktop widget unit from one desktop widget configuration area to another desktop widget configuration area in the desktop widget framework.

The first movement operation that is used to move the first desktop widget unit may be a dragging operation, or another touchscreen operation that moves the first desktop widget unit.

103: Position the first desktop widget unit in a first specified desktop widget configuration area when the first movement operation ends, where the first specified desktop widget configuration area is a blank desktop widget configuration area in which the first movement operation is located when the first movement operation ends; and the first desktop widget unit maps to a first application program.

The first application program may be any application program, such as a mobile phone address book, a contact list, and a clock, that can provide information for a user.

It should be noted that, a desktop widget configuration area has two states, one is blank, that is, the desktop widget configuration area holds no desktop widget unit, and the other is occupied, that is, the desktop widget configuration area already holds a desktop widget unit.

That the first operation ends indicates that a finger of a user moves away from a touchscreen. Then, when the first desktop widget unit is moved to any blank desktop widget configuration area of the desktop widget framework, or the end point of the first movement operation is located in any blank desktop widget configuration area of the desktop widget framework, it is considered that the first operation is effective. In this case, the first desktop widget unit is positioned in the first specified desktop widget configuration area, where the positioning may be considered as placing the first application program, to which the first desktop widget unit maps, in the first specified desktop widget configuration area, and corresponding information of the first application program is displayed in the positioned desktop widget unit. For example, if the first desktop widget unit is a weather Widget, all weather information corresponding to the weather Widget is displayed in the positioned first desktop widget unit.

In this embodiment of the present disclosure, the first movement operation may be an operation combined by multiple sub-operations. When a first movement sub-operation, such as a tapping operation performed on the first desktop widget unit, is detected, a selected movement object is the first desktop widget unit; when a second movement sub-operation, such as a tapping operation performed on a desktop widget unit in the desktop widget framework, is detected, it may be considered that the first movement operation ends, and the first desktop widget unit is positioned in the first specified desktop widget configuration area, where the first specified desktop widget configuration area is the blank desktop widget configuration area in which the first movement operation is located when the first movement operation ends, and a tapped area of the second movement sub-operation may be a specified area of a desktop widget configuration area.

Optionally, on a basis of the technical solutions of the embodiment illustrated in FIG. 1, step 101 "acquire a desktop widget framework of the desktop widget, where the desktop widget framework includes at least two or more than two desktop widget configuration areas" includes steps 101*a* and 101*b* in the following.

101*a*: Display at least one desktop widget framework of the desktop widget.

In this embodiment of the present disclosure, the desktop widget may correspond to at least one desktop widget framework. The number, display shapes, and location relationships of desktop widget configuration areas in the at least one desktop widget framework may be different.

Further, a blank desktop widget framework may be displayed for a user, and the user may customize the number of desktop widget configuration areas, and display shapes and location relationships of the desktop widget configuration areas according to a usage habit in order to generate a customized desktop widget framework.

Figure 2A:
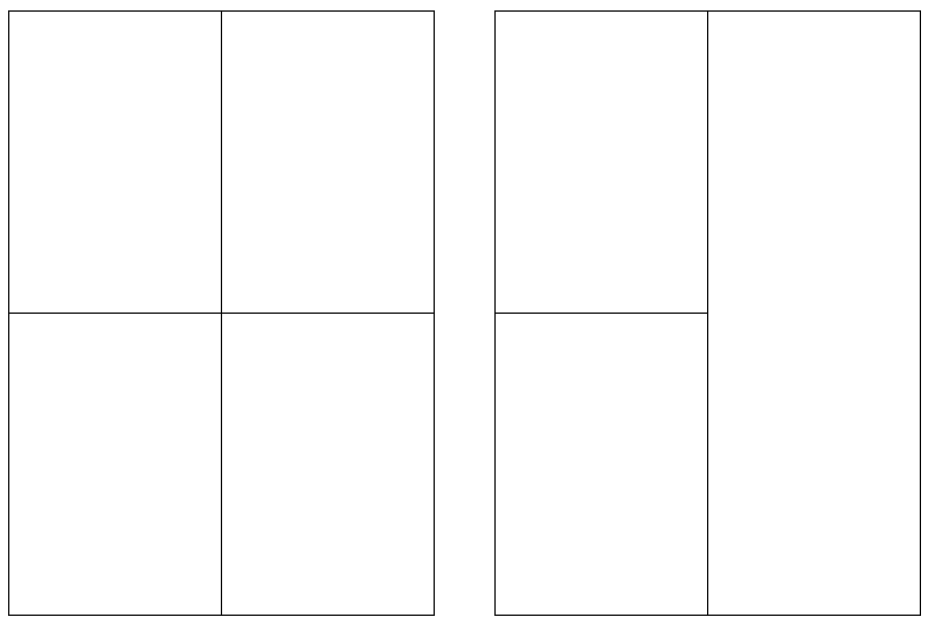
FIG. 2A is a schematic diagram of displaying two desktop widget frameworks on one page.

The at least one desktop widget framework may be displayed on a same page, and may also be displayed on different pages. Referring to FIG. 2A, FIG. 2A is a schematic diagram of displaying two desktop widget frameworks on one page. This embodiment of the present disclosure only uses that two desktop widget frameworks are displayed on a same page for one time as an example for description. A left-side desktop widget framework in FIG. 2A includes 4 desktop widget configuration areas, and a right-side desktop widget framework in FIG. 2A includes 3 desktop widget configuration areas.

101*b*: When a first touchscreen operation performed on any desktop widget framework in the at least one desktop widget framework is received, acquire a desktop widget framework corresponding to the first touchscreen operation, where the first touchscreen operation is used to select the at least one desktop widget framework.

The first touchscreen operation is used to select the at least one desktop widget framework, and the first touchscreen operation may be a touchscreen operation of any kind, for example, a tapping operation or a dragging operation performed on a desktop widget framework. A user may acquire, according to a requirement of the user, a desktop widget framework that meets the requirement from the at least one desktop widget framework.

It should be noted that the acquiring a desktop widget framework of the desktop widget may be acquiring a desktop widget framework that includes multiple blank desktop widget configuration areas, and may also be acquiring a desktop widget framework that includes some blank desktop widget configuration areas and some occupied desktop widget configuration areas. A desktop widget unit displayed in the occupied desktop widget configuration areas may be a default desktop widget unit, and may also be a desktop widget unit that is configured by a user in a previous time.

Optionally, on a basis of the technical solutions of the embodiment illustrated in FIG. 1, after step 101 "acquire a desktop widget framework of the desktop widget", the method further includes the following steps.

(1) Control, according to a second movement operation performed on a second desktop widget unit, the second desktop widget unit to move along a movement track of the second movement operation, where the second movement operation is used to move the second desktop widget unit.

The second desktop widget unit may be a desktop widget unit that is already located in a desktop widget configuration area in the desktop widget framework, and may also be a desktop widget unit that is not positioned in the desktop widget configuration area. That is, the second movement operation may be an operation of adding the second desktop widget unit to the desktop widget configuration area in the desktop widget framework, and may also be an operation of moving the second desktop widget unit from one desktop widget configuration area to another desktop widget configuration area in the desktop widget framework.

The second operation may a dragging operation or another touchscreen operation that moves the second desktop widget unit.

(2) Position the second desktop widget unit in a second specified desktop widget configuration area when the second movement operation ends, where the second specified desktop widget configuration area is a blank desktop widget configuration area in which the second movement operation is located when the second movement operation ends; and the second desktop widget unit maps to the first application program or a second application program.

When the second desktop widget unit maps to the first application program, each application program may be corresponding to at least one desktop widget unit, and a display shape and a type of displayed information of a desktop widget unit corresponding to each application program may be different. For example, that the second desktop widget unit maps to the first application is used as an example for description. In this case, the first desktop widget unit may include first information, second information, and third information, and a display shape of the first widget unit is a 2 centimeters (cm)*2 cm square; and the second desktop widget unit includes only the first information and the second information, and a display shape of the second widget unit is a circle with a radius of 2 cm.

When the second desktop widget unit maps to the second application program, for one desktop widget framework, a desktop widget unit held in each desktop widget configuration area of the desktop widget framework may respectively map to a different application program. For example, one desktop widget configuration area maps to a weather application program, and another one maps to a clock application program.

Using the technical solutions provided in this embodiment of the present disclosure, by means of configuring two or more than two desktop widget configuration areas, a purpose of implementing multiple Widgets in one desktop widget framework is achieved, which satisfies characteristic customization of different users, and improves personalization of terminal device configuration.

Optionally, on a basis of the technical solutions of the embodiment illustrated in FIG. 1, step 103 "position the first desktop widget unit in a first specified desktop widget configuration area when the first movement operation ends, where the first specified desktop widget configuration area is a blank desktop widget configuration area in which the first movement operation is located when the first movement operation ends; and the first desktop widget unit maps to a first application program" includes, when the first movement operation ends, and an overlap ratio of the first desktop widget unit to the desktop widget configuration area in which the end point of the first movement operation is located is greater than or equal to a preset ratio, positioning the first desktop widget unit in the first specified desktop widget configuration area, where the first specified desktop widget configuration area is the blank desktop widget configuration area in which the first movement operation is located when the first movement operation ends; and the first desktop widget unit maps to the first application program.

To avoid misoperation, a preset ratio may be set, where the preset ratio is used to measure, when a movement operation ends, whether an overlap ratio of a moved desktop widget unit to a desktop widget configuration area in which the desktop widget unit is located meets a positioning condition. When the first movement operation ends, and the overlap ratio of the first desktop widget unit to the desktop widget configuration area in which the end point of the first movement operation is located is greater than or equal to the preset ratio, the positioning condition is met, and the first desktop widget unit is positioned. The positioning herein may indicate repositioning of the first desktop widget unit; that is, layout information of the first desktop widget unit is updated to information about a desktop widget configuration area in which the first desktop widget unit is currently located. When the first movement operation ends, and the overlap ratio of the first desktop widget unit to the desktop widget configuration area in which the end point of the first movement operation is located is less than the preset ratio, the positioning condition is not met, and the first desktop widget unit is not positioned; that is, the layout information of the first desktop widget unit is not updated.

Further, optionally, on a basis of the technical solutions of the embodiment illustrated in FIG. 1, after step 102 "control, according to a first movement operation performed on a first desktop widget unit, the first desktop widget unit to move along a movement track of the first movement operation", the method further includes, when the first movement operation ends, and an overlap ratio of the first desktop widget unit to a desktop widget configuration area in which an end point of the first movement operation is located is less than a preset ratio, positioning the first desktop widget unit in a third specified desktop widget configuration area, where the third specified desktop widget configuration area is a desktop widget configuration area in which the first desktop widget unit is located before the first movement operation starts; and the first desktop widget unit maps to a first application program.

When the first movement operation ends, and the overlap ratio of the first desktop widget unit to the desktop widget configuration area in which the end point of the first movement operation is located is less than the preset ratio, a positioning condition is not met, and the first desktop widget unit is not positioned; instead, the first desktop widget unit is positioned in the desktop widget configuration area in which the first desktop widget unit is located before the first movement operation starts; that is, layout information of the first desktop widget unit is not updated.

The preset ratio is a preset overlap ratio of the first desktop widget unit to the desktop widget configuration area in which the end point of the first movement operation is located. In a movement process, because a size of the first desktop widget unit may be smaller than a desktop widget configuration area, when the first desktop widget unit fully enters the desktop widget configuration area, the overlap ratio is 100%. After positioning, the first desktop widget unit may be adjusted according to a size of the desktop widget configuration area in order to fill in the desktop widget configuration area.

Optionally, on a basis of the technical solutions in the embodiment illustrated in FIG. 1, after step 103 "position the first desktop widget unit in a first specified desktop widget configuration area when the first movement operation ends", the method further includes the following steps.

104: Save positioning information of the positioned first desktop widget unit in the desktop widget framework as layout information of the first desktop widget unit.

By moving the first desktop widget unit, a purpose of repositioning the first desktop widget unit is achieved; and the positioning information of the positioned first desktop widget unit in the desktop widget framework is saved as the layout information of the first desktop widget unit in order to ensure that, when the desktop widget is run again, the desktop widget loads the first desktop widget unit according to the save layout information.

105: When a second touchscreen operation performed on the desktop widget is received, load each desktop widget unit according to saved layout information of each desktop widget unit; and display each desktop widget unit at a location, corresponding to the layout information of each desktop widget unit, in the desktop widget, where the second touchscreen operation is used to start the desktop widget.

The second touchscreen operation is used to start the desktop widget. The second touchscreen operation may be a touchscreen operation of any kind that can start the desktop widget, for example, a tapping operation performed on the desktop widget, or a sliding operation performed, in a specified direction, on an icon of the desktop widget.

Further, when a user needs to delete some or all desktop widget units in a desktop widget configuration area, the user may delete objects to be deleted one by one, and may also delete the objects to be deleted in entirety. That is, when an editing instruction is received, a terminal device presents a delete option in each desktop widget configuration area, or displays a delete option in a desktop widget configuration area selected by the user. When the delete option is activated, a desktop widget unit in the desktop widget configuration area may be deleted. The delete option may also be used to delete all desktop widget units, and when the delete option is activated, the terminal device performs a deleting operation on desktop widget units in all desktop widget configuration areas, thereby displaying a blank desktop widget framework in order to implement a one-tap-delete operation for the user. The editing instruction may be triggered when the user taps a pane in a desktop widget configuration area, or when an edit option provided by the terminal device is activated.

Optionally, on a basis of the technical solutions of the embodiment illustrated in FIG. 1, the desktop widget framework further includes a desktop widget unit selection area, where the desktop widget unit selection area includes at least one desktop widget unit. Correspondingly, the first desktop widget unit is located in the desktop widget unit selection area, or the first desktop widget unit is located in any desktop widget configuration area of the desktop widget framework.

A desktop widget framework displayed on a screen of a terminal device may include a desktop widget configuration area and a desktop widget unit selection area. The desktop widget unit selection area is a to-be-selected area of a desktop widget unit, and a user may select, from the desktop widget unit selection area, a desktop widget unit that the user needs to load.

The desktop widget unit selection area may load a desktop widget unit by acquiring basic information of all Widget application programs installed in a current system.

Figure 2B:
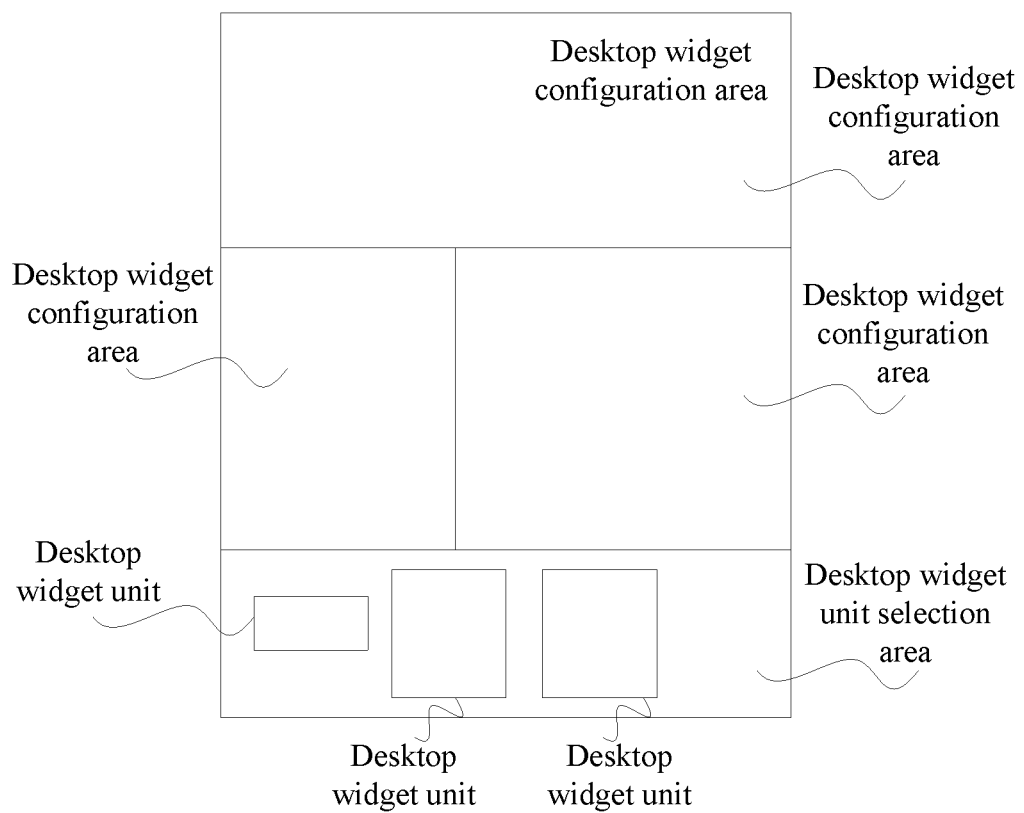
FIG. 2B is a schematic diagram of a location relationship between a desktop widget configuration area and a desktop widget unit selection area according to an embodiment of the present disclosure.

There may be various display manners of the desktop widget unit selection area. The area may be a drop-down area triggered by a touchscreen operation, where the drop-down area includes at least one desktop widget unit; and may also be a strip-type area of a desktop widget unit that may be displayed by triggering of a horizontal sliding operation. A location relationship between the desktop widget configuration area and the desktop widget unit selection area may be vertical, horizontal, or the like. FIG. 2B is a schematic diagram of a location relationship between a desktop widget configuration area and desktop widget unit selection area. In FIG. 2B, only a vertical relationship between the desktop widget configuration area and the desktop widget unit selection area is used as an example.

The desktop widget framework in this embodiment of the present disclosure is a WidgetUnitProvider framework that is implemented by expanding a standard Widget architecture. Tag information that identifies a MeWidget application may be added by modifying configuration information of a general Widget. A Widget Unit Provider is inherited from a WidgetUnitProvider type such that the Widget Unit Provider has a related feature of a Widget Unit.

Figure 2C:
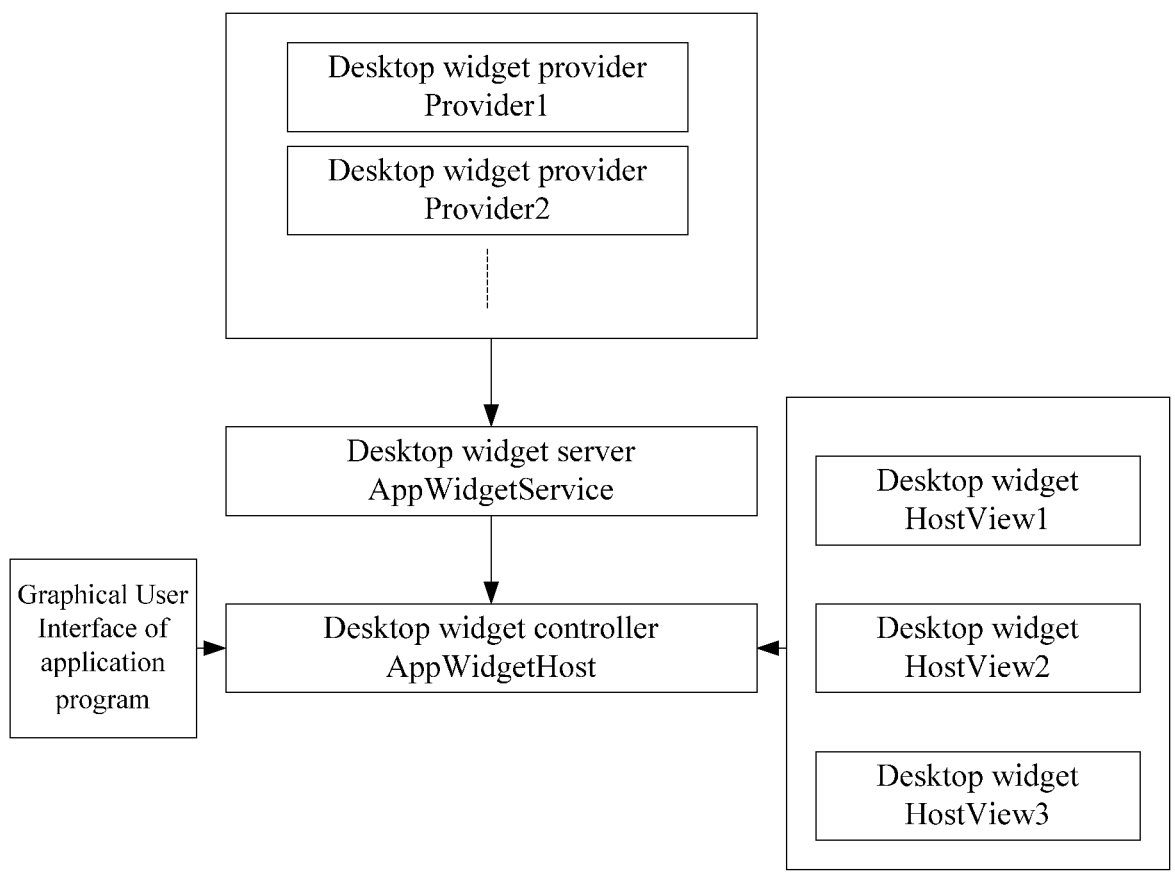
FIG. 2C is a schematic structural diagram of a standard Widget architecture according to an embodiment of the present disclosure.

FIG. 2C is a schematic structural diagram of a standard Widget architecture according to an embodiment of the present disclosure. Referring to FIG. 2C, the standard Widget architecture includes: a Graphical User Interface of application program (Home desktop), a desktop widget controller AppWidgetHost, multiple desktop widget providers Provider, and a desktop widget server AppWidgetService. The Launcher possesses an AppWidgetHost, where the AppWidgetHost is used to manage multiple Widgets, and each Widget is displayed in one HostView. The Provider is used to provide display information for a Widget Provider of an AppWidget. The AppWidgetService is used as a link between the Provider and a desktop widget HostView, which ensures that display information of the Widget Provider can be updated to the HostView.

Figure 2D:
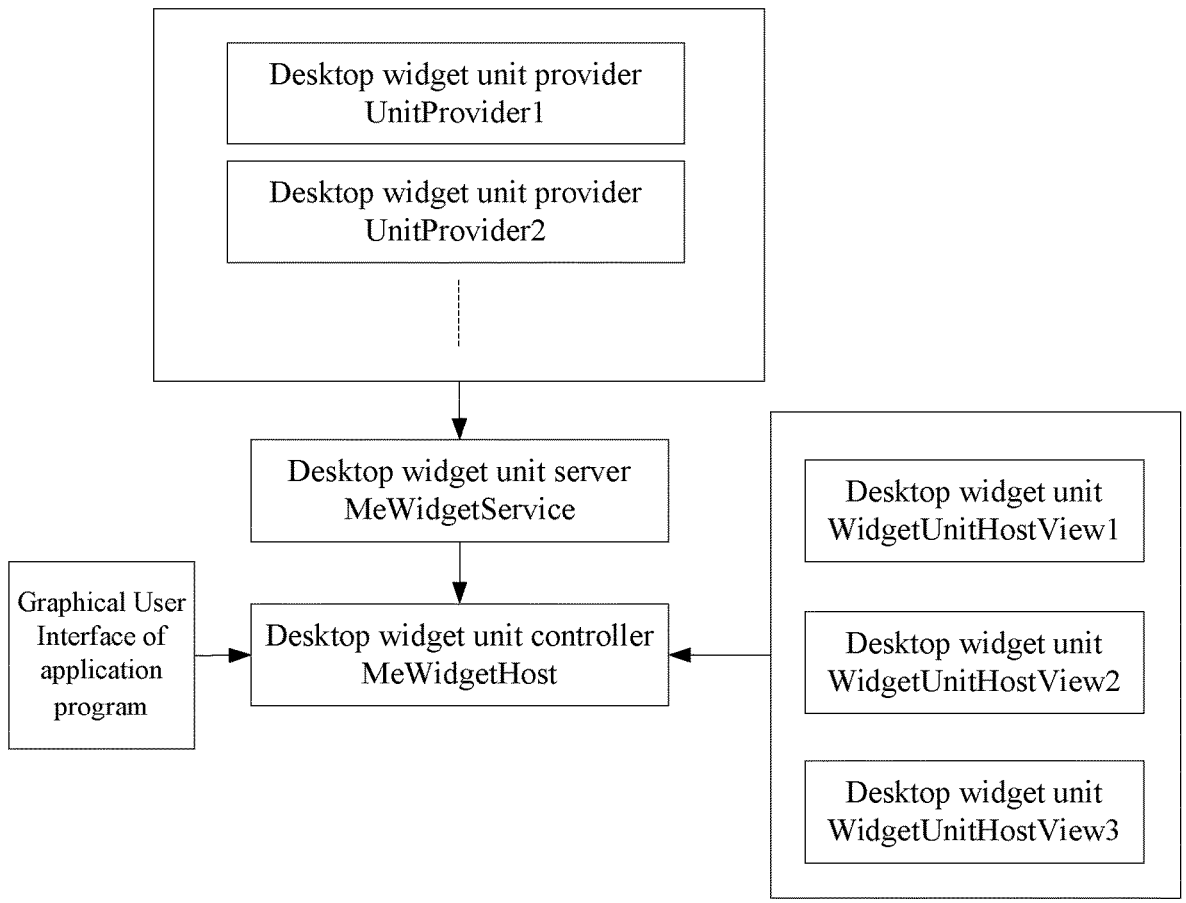
FIG. 2D is a schematic structural diagram of an expanded MeWidget architecture according to an embodiment of the present disclosure.

A MeWidget architecture can be obtained by expanding a standard Widget architecture. FIG. 2D is a schematic structural diagram of a MeWidget architecture obtained by expanding the standard Widget architecture according to this embodiment of the present disclosure. Referring to FIG. 2D, the MeWidget architecture after expansion includes a Graphical User Interface of application program (Home desktop), a desktop widget unit controller MeWidgetHost, multiple desktop widget units WidgetUnitHostView, a desktop widget unit service MeWidgetService, and multiple desktop widget unit providers UnitProvider.

The MeWidgetHost is used to manage layout information of multiple (WidgetUnitHostViews). A display location of each WidgetUnitHostView in the MeWidget may be controlled using layout information, in the MeWidgetHost, of each desktop widget unit. For example, a clock UnitView is displayed below a weather UnitView and over a contact UnitView. Each WidgetUnitHostView may display, in a nested manner, an application program corresponding to the WidgetUnitHostView, that is, layout information of an application package (APK). After the foregoing expansion, the MeWidget may support displaying, in different desktop widget configuration areas, desktop widget units of a same application program; that is, desktop widget units mapping to a same APK are displayed in different WidgetUnitHostViews, and the desktop widget units (WidgetUnitHostView) may be configured.

The MeWidgetService is used as a link between the UnitProvider and a WidgetUnitHostView, which ensures that content of a Widget Provider can be updated to the WidgetUnitHostView.

The UnitProvider is used to represent a Widget Provider content provider of a Unit. An implementation manner of the UnitProvider is similar to an implementation manner of a standard AppWidgetProvider. All operations, including updating (onupdate) and deleting (ondelete) of each desktop widget unit, are implemented in the UnitProvider.

Figure 3:
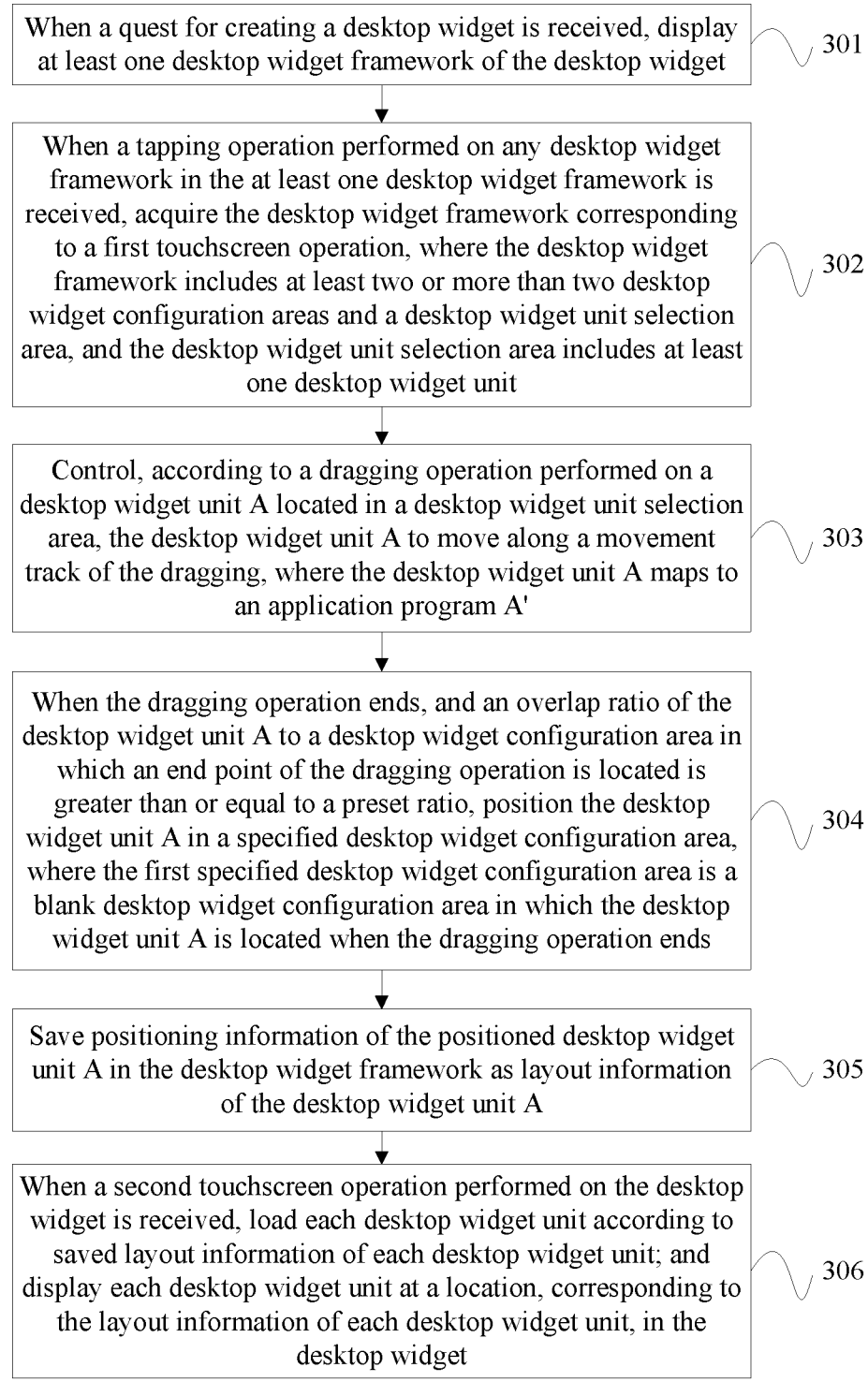
FIG. 3 is a flowchart of a method for creating a desktop widget according to an embodiment of the present disclosure.

FIG. 3 is a flowchart of a method for creating a desktop widget according to an embodiment of the present disclosure. Referring to FIG. 3, the method includes the following steps.

301: When a quest for creating a desktop widget is received, display at least one desktop widget framework of the desktop widget.

A terminal device may provide an option of creating a desktop widget that can accommodate multiple desktop widget units and an option of creating a desktop widget that can accommodate one desktop widget unit. In this embodiment of the present disclosure, only a process of creating a desktop widget that can accommodate multiple desktop widget units is used as an example for description.

302: When a tapping operation performed on any desktop widget framework in the at least one desktop widget framework is received, acquire a desktop widget framework corresponding to a first touchscreen operation, where the desktop widget framework includes at least two or more than two desktop widget configuration areas and a desktop widget unit selection area, and the desktop widget unit selection area includes at least one desktop widget unit.

In this embodiment of the present disclosure, only that the first touchscreen operation is a tapping operation is used as an example for description.

303: Control, according to a dragging operation performed on a desktop widget unit A located in a desktop widget unit selection area, the desktop widget unit A to move along a movement track of the dragging, where the desktop widget unit A maps to an application program A'.

In this embodiment of the present disclosure, only that a first desktop widget unit is the desktop widget unit A, a first application program to which the desktop widget unit A maps is the application program A', and a first movement operation is the dragging operation is used as an example for description.

304: When the dragging operation ends, and an overlap ratio of the desktop widget unit A to a desktop widget configuration area in which an end point of the dragging operation is located is greater than or equal to a preset ratio, position the desktop widget unit A in a first specified desktop widget configuration area, where the first specified desktop widget configuration area is a blank desktop widget configuration area in which the desktop widget unit A is located when the dragging operation ends.

The foregoing steps 302 to 304 are only a process of positioning a desktop widget unit in the creation process. A process of positioning each desktop widget unit in the creation process is similar to steps 302 to 304, which is not described herein again.

305: Save positioning information of the positioned desktop widget unit A in the desktop widget framework as layout information of the desktop widget unit A.

When the positioning process ends, a user saves the positioning information of the desktop widget unit A; that is, information about a desktop widget configuration area in which the desktop widget unit A is located is saved.

In the process of creating the desktop widget, a user may perform an operation, such as adding, deleting, or moving on a desktop widget unit randomly. The desktop widget may provide a save option for a user, and when the save option is activated, all layout information created in the creation process is saved in a database such that the desktop widget performs corresponding loading in next running, and it is ensured that each desktop widget unit created this time can be displayed according to a display effect of a configuration page.

306: When a second touchscreen operation performed on the desktop widget is received, load each desktop widget unit according to saved layout information of each desktop widget unit; and display each desktop widget unit at a location, corresponding to the layout information of each desktop widget unit, in the desktop widget.

Figure 4:
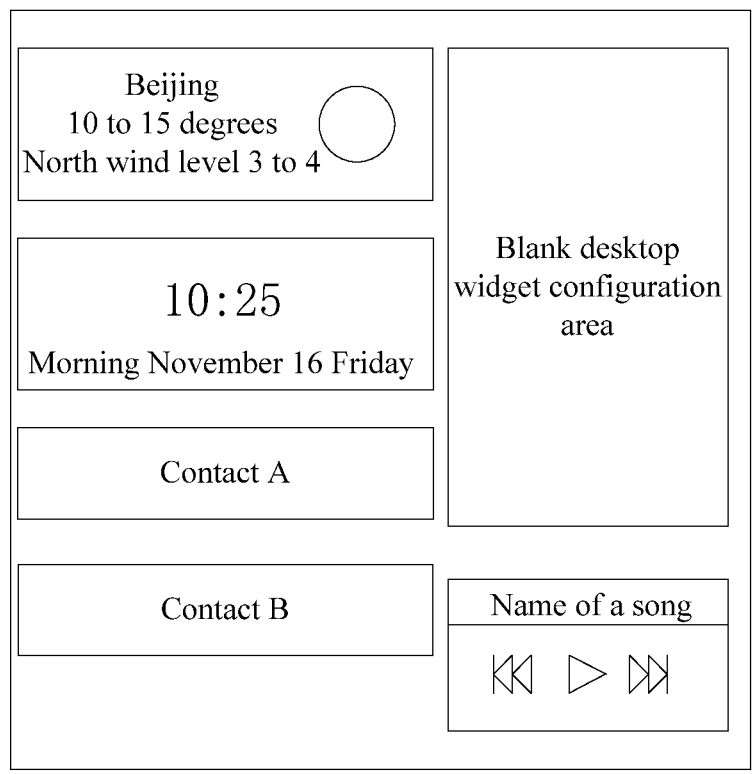
FIG. 4 is an exemplary diagram of desktop widget display according to an embodiment of the present disclosure.

For example, in the creation process, desktop widget units, including a clock, weather, contact A and B, and an audio device, are created in the desktop widget; and the desktop widget may be as shown in FIG. 4 when the desktop widget runs according to the saved layout information of each desktop widget unit. FIG. 4 is an exemplary diagram of display of the desktop widget according this embodiment of the present disclosure; and FIG. 4 is merely an example of the display of the desktop widget.

In this embodiment of the present disclosure, the desktop widget may be considered as a Home container, and nay desktop widget unit can be loaded in the desktop widget. The desktop widget unit may be different desktop widget units that map to a same application program, and may also be desktop widget units that map to different application programs. When the desktop widget units map to different application programs, these desktop widget units separately belong to different APKs; and loading of these desktop widget units can be implemented Using a cross-APK loading technology. By loading desktop widget units of different application programs, the desktop widget may load views of different application programs (e.g., different APKs) together in a bounded manner during running, and display the views according to space and a location assigned during creation. The desktop widget and each desktop widget unit are in a loose coupling relationship. This kind of organization manner is more favorable for subsequent expansion and maintenance of the desktop widget unit.

Figure 5:
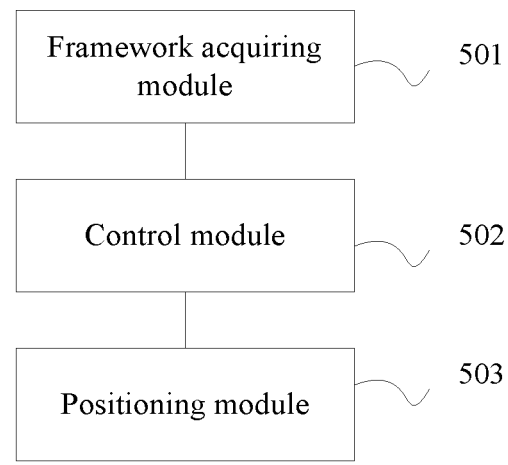
FIG. 5 is a schematic structural diagram of an apparatus for creating a desktop widget according to an embodiment of the present disclosure.

FIG. 5 is a schematic structural diagram of an apparatus for creating a desktop widget according to an embodiment of the present disclosure. Referring FIG. 5, the apparatus includes a framework acquiring module 501 configured to acquire a desktop widget framework of the desktop widget, where the desktop widget framework is used to hold at least two or more than two desktop widget units, and the desktop widget framework includes at least two or more than two desktop widget configuration areas; a control module 502 configured to control, according to a first movement operation performed on a first desktop widget unit, the first desktop widget unit to move along a movement track of the first movement operation, where the first movement operation is used to move the first desktop widget unit; and a positioning module 503 configured to position the first desktop widget unit in a first specified desktop widget configuration area when the first movement operation ends, where the first specified desktop widget configuration area is a blank desktop widget configuration area in which the first movement operation is located when the first movement operation ends; and the first desktop widget unit maps to a first application program.

Optionally, the framework acquiring module 501 is configured to display at least one desktop widget framework of the desktop widget; and when a first touchscreen operation performed on any desktop widget framework in the at least one desktop widget framework is received, acquire a desktop widget framework corresponding to the first touchscreen operation, where the first touchscreen operation is used to select the at least one desktop widget framework.

Optionally, the control module 502 is further configured to control, according to a second movement operation performed on a second desktop widget unit, the second desktop widget unit to move along a movement track of the second movement operation, where the second movement operation is used to move the second desktop widget unit; and the positioning module 503 is further configured to position the second desktop widget unit in a second specified desktop widget configuration area when the second movement operation ends, where the second specified desktop widget configuration area is a blank desktop widget configuration area the second movement operation is located when the second movement operation ends; and the second desktop widget unit maps to the first application program or a second application program.

Optionally, the positioning module 503 is configured to, when the first movement operation ends, and an overlap ratio of the first desktop widget unit to the desktop widget configuration area in which the end point of the first movement operation is located is greater than or equal to a preset ratio, position the first desktop widget unit in the first specified desktop widget configuration area, where the first specified desktop widget configuration area is the blank desktop widget configuration area in which the first movement operation is located when the first movement operation ends; and the first desktop widget unit maps to the first application program.

Optionally, the apparatus further includes a storing module configured to save positioning information of the positioned first desktop widget unit in the desktop widget framework as layout information of the first desktop widget unit; and a loading module configured to, when a second touchscreen operation performed on the desktop widget is received, load each desktop widget unit according to saved layout information of each desktop widget unit; and display each desktop widget unit at a location, corresponding to the layout information of each desktop widget unit, in the desktop widget, where the second touchscreen operation is used to start the desktop widget.

Using the technical solutions provided in this embodiment of the present disclosure, by means of configuring two or more than two desktop widget configuration areas, a purpose of implementing multiple Widgets in one desktop widget framework is achieved, which satisfies characteristic customization of different users, and improves personalization of terminal device configuration.

It should be noted that when the apparatus for creating a desktop widget according to the foregoing embodiment creates a desktop widget, division of the foregoing function modules is exemplary only; in an implementation, the foregoing functions can be allocated to different modules and implemented as necessary, that is, an inner structure of the apparatus is divided into different function modules to implement all or a part of the functions described above. In addition, the apparatus for creating a desktop widget according to the foregoing embodiment pertains to a same conception as the embodiment of the method for creating a desktop top widget. For details about a specific implementation process of the apparatus, reference may be made to the method embodiment, and is not described herein again.

A person of ordinary skill in the art may understand that all or a part of steps of the foregoing embodiments may be implemented by hardware or a program instructing relevant hardware. The program may be stored in a computer readable storage medium. The storage medium may include a read-only memory, a magnetic disk, an optical disc, or the like.

Figure 6:
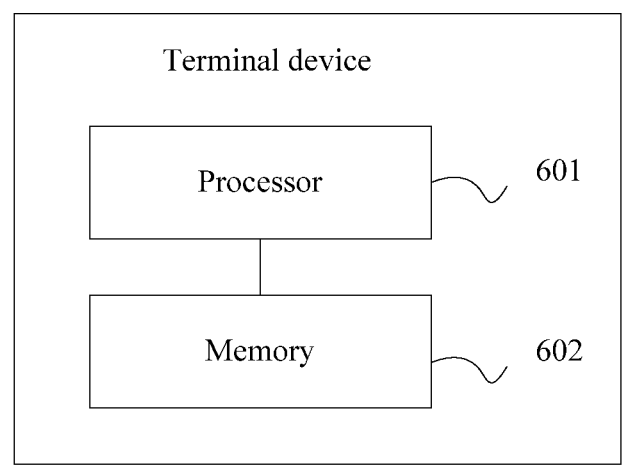
FIG. 6 is a schematic structural diagram of a terminal device according to an embodiment of the present disclosure.

FIG. 6 is a schematic structural diagram of a terminal device according to an embodiment of the present disclosure. Referring to FIG. 6, the terminal device includes a processor 601 configured to acquire a desktop widget framework of a desktop widget, where the desktop widget framework is used to hold at least two or more than two desktop widget units, and the desktop widget framework includes at least two or more than two desktop widget configuration areas; where the processor 601 is further configured to control, according to a first movement operation performed on a first desktop widget unit, the first desktop widget unit to move along a movement track of the first movement operation, where the first movement operation is used to move the first desktop widget unit; and the processor is further configured to position the first desktop widget unit in a first specified desktop widget configuration area when the first movement operation ends, where the first specified desktop widget configuration area is a blank desktop widget configuration area in which the first movement operation is located when the first movement operation ends; and the first desktop widget unit maps to a first application program.

Optionally, the processor 601 is configured to display at least one desktop widget framework of the desktop widget; and when a first touchscreen operation performed on any desktop widget framework in the at least one desktop widget framework is received, acquire a desktop widget framework corresponding to the first touchscreen operation, where the first touchscreen operation is used to select the at least one desktop widget framework.

Optionally, the processor 601 is further configured to control, according to a second movement operation performed on a second desktop widget unit, the second desktop widget unit to move along a movement track of the second movement operation, where the second movement operation is used to move the second desktop widget unit; and the processor 601 is further configured to position the second desktop widget unit in a second specified desktop widget configuration area when the second movement operation ends, where the second specified desktop widget configuration area is a blank desktop widget configuration area in which the second movement operation is located when the second movement operation ends; and the second desktop widget unit maps to the first application program or a second application program.

Optionally, the processor 601 is configured to, when the first movement operation ends, and an overlap ratio of the first desktop widget unit to the desktop widget configuration area in which the end point of the first movement operation is located is greater than or equal to a preset ratio, position the first desktop widget unit in the first specified desktop widget configuration area, where the first specified desktop widget configuration area is the blank desktop widget configuration area in which the first movement operation is located when the first movement operation ends; and the first desktop widget unit maps to the first application program.

Optionally, the terminal device further includes a memory 602 configured to save positioning information of the positioned first desktop widget unit in the desktop widget framework as layout information of the first desktop widget unit; where the processor 601 is further configured to, when a second touchscreen operation performed on the desktop widget is received, load each desktop widget unit according to saved layout information of each desktop widget unit; and display each desktop widget unit at a location, corresponding to the layout information of each desktop widget unit, in the desktop widget, where the second touchscreen operation is used to start the desktop widget.

Using the technical solutions provided in this embodiment of the present disclosure, by means of configuring two or more than two desktop widget configuration areas, a purpose of implementing multiple Widgets in one desktop widget framework is achieved, which satisfies characteristic customization of different users, and improves personalization of terminal device configuration.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method for creating a desktop widget, comprising:
acquiring a first desktop widget framework of the desktop widget, wherein the first desktop widget framework is configured to hold at least two desktop widget units, wherein the first desktop widget framework comprises at least two desktop widget configuration areas, and wherein the desktop widget is displayed on a desktop and is selectable to launch one or more applications mapped to the desktop widget;
adding a first desktop widget unit to the desktop widget by:
controlling, based on a first movement operation performed on the first desktop widget unit, the first desktop widget unit to move along a movement track of the first movement operation, wherein the first desktop widget unit maps to a first application program; and
positioning the first desktop widget unit in a first specified desktop widget configuration area of the at least two desktop widget configuration areas when the first movement operation ends, wherein the first specified desktop widget configuration area is a blank desktop widget configuration area in which the first movement operation is located when the first movement operation ends;
presenting a delete option in the at least two desktop widget configuration areas responsive to a first tap operation within one of the at least two desktop widget configuration areas;
performing, responsive to a second tap operation on the delete option, a deleting operation on multiple desktop widget units in the at least two desktop widget configuration areas;
adding a second desktop widget unit to the desktop widget by:
controlling, based on a second movement operation performed on the second desktop widget unit, the second desktop widget unit to move along a movement track of the second movement operation, wherein the second desktop widget unit maps to the first application program, wherein the first desktop widget unit indicates first information, second information, and third information, wherein the second desktop widget unit indicates only the first information and the second information, and wherein a shape of the first desktop widget unit is different than a shape of the second desktop widget unit; and
positioning the second desktop widget unit in a second specified desktop widget configuration area when the second movement operation ends, wherein the second specified desktop widget configuration area is a blank desktop widget configuration area at a location at which the second movement operation ends; and
saving the desktop widget framework, the at least two desktop widget configuration areas, and the first and second desktop widget units for retrieval as an integrated desktop widget.

2. The method of claim 1, wherein acquiring the first desktop widget framework of the desktop widget comprises:
displaying at least one desktop widget framework of the desktop widget; and
acquiring a desktop widget framework corresponding to a first touchscreen operation as the first desktop widget framework when the first touchscreen operation is performed on any desktop widget framework in the at least one desktop widget framework, wherein the first touchscreen operation is further configured to select the first desktop widget framework.

3. The method of claim 1, further comprising displaying, responsive to a touchscreen operation, a desktop widget selection area that includes the first desktop widget unit and the second desktop widget unit.

4. The method of claim 1, further comprising deleting the saved integrated desktop widget in one operation.

5. The method of claim 3, wherein the desktop widget selection area is a strip-type area, and wherein the touchscreen operation is a horizontal sliding operation.

6. The method of claim 1, wherein an overlap ratio of the first desktop widget unit to the first specified desktop widget configuration area in which the first movement operation is located when the first movement operation ends is greater than or equal to a preset ratio.

7. The method of claim 1, wherein after positioning the first desktop widget unit in the first specified desktop widget configuration area when the first movement operation ends, the method further comprises:
saving positioning information of the first desktop widget unit in the first desktop widget framework as layout information of the first desktop widget unit;
loading each of the at least two desktop widget units based on saved layout information of each of the at least two desktop widget units when a second touchscreen operation performed on the desktop widget is received; and
displaying each of the at least two desktop widget units at a location corresponding to the layout information of each of the at least two desktop widget units in the desktop widget, wherein the second touchscreen operation is configured to start the desktop widget.

8. The method of claim 1, further comprising:
acquiring multiple desktop widget frameworks, wherein the multiple desktop widget frameworks include the first desktop widget framework; and
displaying each of the multiple desktop widget frameworks on a same page.

9. A terminal device, comprising:
a memory; and
a processor coupled to the memory and configured to:
acquire a first desktop widget framework of a desktop widget, wherein the first desktop widget framework is configured to hold at least two desktop widget units, wherein the first desktop widget framework comprises at least two desktop widget configuration areas, and wherein the desktop widget is displayed on a desktop and is selectable to launch one or more applications mapped to the desktop widget;
add a first desktop widget unit to the desktop widget by:
controlling, based on a first movement operation performed on the first desktop widget unit, the first desktop widget unit to move along a movement track of the first movement operation, wherein the first desktop widget unit maps to a first application program; and
positioning the first desktop widget unit in a first specified desktop widget configuration area when the first movement operation ends, wherein the first specified desktop widget configuration area is a blank desktop widget configuration area in which the first movement operation is located when the first movement operation ends;
present a delete option in the at least two desktop widget configuration areas responsive to a first tap operation within one of the at least two desktop widget configuration areas;
perform, responsive to a second tap operation on the delete option, a deleting operation on multiple desktop widget units in each of the at least two desktop widget configuration areas;
add a second desktop widget unit to the desktop widget by:
controlling, based on a second movement operation performed on the second desktop widget unit, the second desktop widget unit to move along a movement track of the second movement operation, wherein the second desktop widget unit maps to the first application program, wherein the first desktop widget unit indicates first information, second information, and third information, wherein the second desktop widget unit indicates only the first information and the second information, and wherein a shape of the first desktop widget unit is different than a shape of the second desktop widget unit; and positioning the second desktop widget unit in a second specified desktop widget configuration area when the second movement operation ends, wherein the second specified desktop widget configuration area is a blank desktop widget configuration area at a location at which the second movement operation ends; and save the desktop widget framework, the at least two desktop widget configuration areas, and the first and second desktop widget units for retrieval as an integrated desktop widget.

10. The terminal device of claim 9, wherein the processor is configured to acquire the first desktop widget framework by being configured to:

display at least one desktop widget framework of the desktop widget; and acquire a desktop widget framework corresponding to a first touchscreen operation as the first desktop widget framework when the first touchscreen operation is performed on any desktop widget framework in the at least one desktop widget framework, wherein the first touchscreen operation is further configured to select the first desktop widget framework.

11. The terminal device of claim 9, wherein the processor is further configured to cause the terminal device to display, responsive to a touchscreen operation, a desktop widget selection area that includes the first desktop widget unit and the second desktop widget unit.

12. The terminal device of claim 9, wherein the processor is further configured to cause the terminal device to be configured to delete the saved integrated desktop widget in one operation.

13. The terminal device of claim 11, wherein the desktop widget selection area is a strip-type area, and wherein the touchscreen operation is a horizontal sliding operation.

14. The terminal device of claim 9, wherein an overlap ratio of the first desktop widget unit to the first specified desktop widget configuration area in which the first movement operation is located when the first movement operation ends is greater than or equal to a preset ratio.

15. The terminal device of claim 9, wherein the memory is configured to save positioning information of the first desktop widget unit in the first desktop widget framework as layout information of the first desktop widget unit, and wherein the processor is further configured to:

load each of the at least two desktop widget units based on saved layout information of each of the at least two desktop widget units when a second touchscreen operation is performed on the desktop widget; and display each of the at least two desktop widget units at a location corresponding to the layout information of each of the at least two desktop widget units in the desktop widget, wherein the second touchscreen operation is configured to start the desktop widget.

16. A terminal device including a computer readable medium storing instructions that, when executed by a processor, are configured to cause the terminal device to:

acquire a first desktop widget framework of a desktop widget, wherein the first desktop widget framework is configured to hold at least two desktop widget units, wherein the first desktop widget framework comprises at least two desktop widget configuration areas, and wherein the desktop widget is displayed on a desktop and is selectable to launch one or more applications mapped to the desktop widget;

add a first desktop widget unit to the desktop widget by:

controlling, based on a first movement operation performed on the first desktop widget unit, the first desktop widget unit to move along a movement track of the first movement operation, wherein the first desktop widget unit maps to a first application program; and positioning the first desktop widget unit in a first specified desktop widget configuration area when the first movement operation ends, wherein the first specified desktop widget configuration area is a blank desktop widget configuration area in which the first movement operation is located when the first movement operation ends;

present a delete option in the at least two desktop widget configuration areas responsive to a first tap operation within one of the at least two desktop widget configuration areas;

perform, responsive to a second tap operation on the delete option, a deleting operation on multiple desktop widget units in each of the at least two desktop widget configuration areas when a delete option is activated;

add a second desktop widget unit to the desktop widget by:

controlling, based on a second movement operation performed on the second desktop widget unit, the second desktop widget unit to move along a movement track of the second movement operation, wherein the second desktop widget unit maps to the first application program, wherein the first desktop widget unit indicates first information, second information, and third information, wherein the second desktop widget unit indicates only the first information and the second information, and wherein a shape of the first desktop widget unit is different than a shape of the second desktop widget unit; and positioning the second desktop widget unit in a second specified desktop widget configuration area when the second movement operation ends, wherein the second specified desktop widget configuration area is a blank desktop widget configuration area at a location at which the second movement operation ends; and saving the desktop widget framework, the at least two desktop widget configuration areas, and the first and second desktop widget units for retrieval as an integrated desktop widget.

17. The terminal device of claim 16, wherein the instructions are further configured to cause the terminal device to be configured to:

display at least one desktop widget framework of the desktop widget; and acquire a desktop widget framework corresponding to a first touchscreen operation as the first desktop widget framework when the first touchscreen operation is performed on any desktop widget framework in the at least one desktop widget framework, wherein the first touchscreen operation is further configured to select the first desktop widget framework.

18. The terminal device of claim 16, wherein the instructions are further configured to cause the terminal device to be configured to display, responsive to a touchscreen operation, a desktop widget selection area that includes the first desktop widget unit and the second desktop widget unit.

19. The terminal device of claim 16, wherein the instructions are further configured to cause the terminal device to be configured to delete the saved integrated desktop widget in one operation.

20. The terminal device of claim 18, wherein the desktop widget selection area is a strip-type area, and wherein the touchscreen operation is a horizontal sliding operation.

\* \* \* \* \*